Jan. 17, 1939.  R. M. NARDONE  2,144,195
ENGINE STARTING MECHANISM
Filed May 20, 1936   2 Sheets-Sheet 2

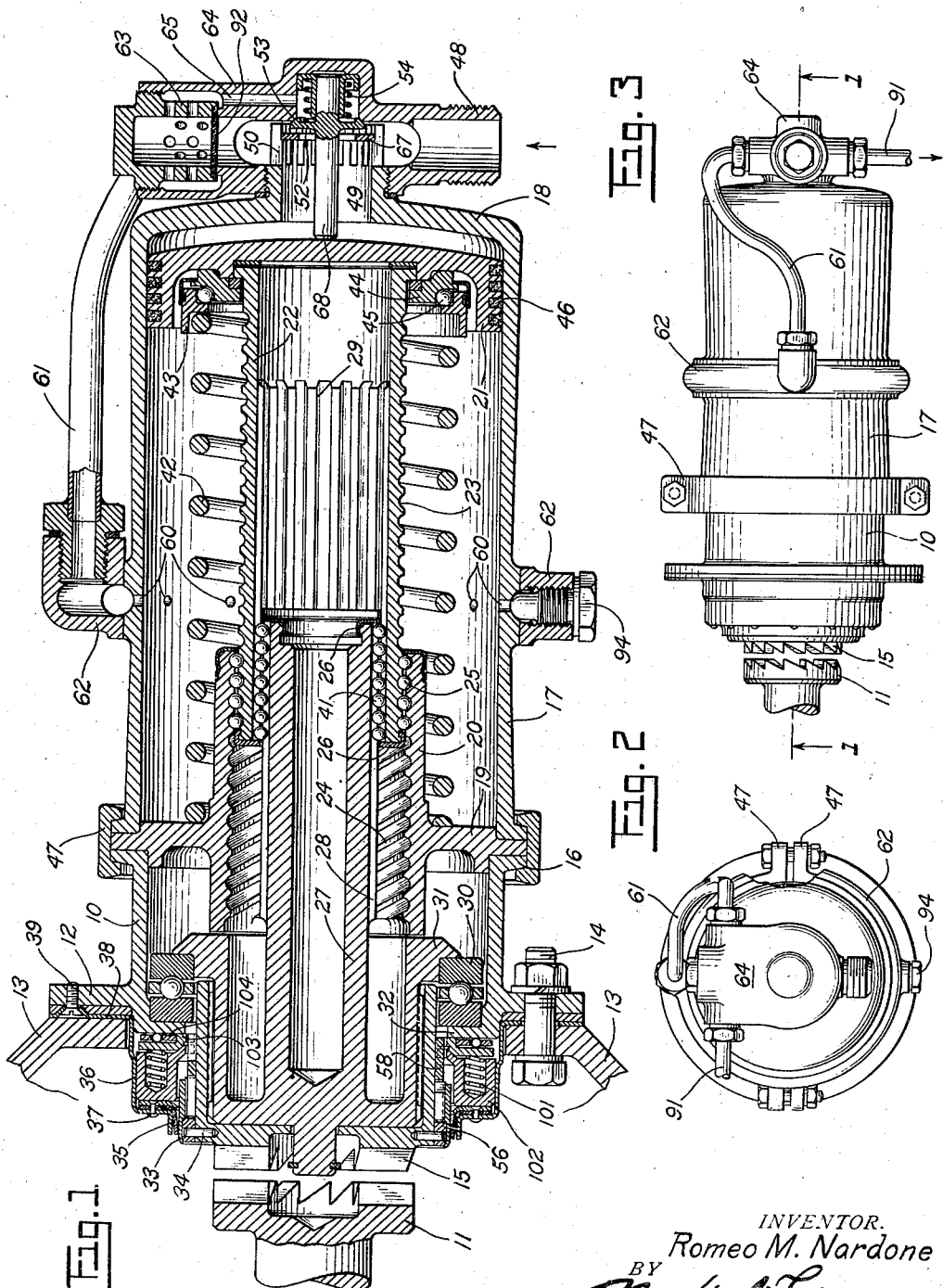

INVENTOR.
Romeo M. Nardone
BY
ATTORNEY

Patented Jan. 17, 1939

2,144,195

UNITED STATES PATENT OFFICE 2,144,195

ENGINE STARTING MECHANISM

Romeo M. Nardone, East Orange, N. J., assignor to Eclipse Aviation Corporation, East Orange, N. J., a corporation of New Jersey Application May 20, 1936, Serial No. 80,885

4 Claims. (Cl. 121—37)

This invention relates to engine starters adapted for utilizing fluid pressure as from air precompressed into a reservoir or from an explosive cartridge, the latter embodiment being illustrated in the drawings.

One object of the invention is to provide a simple, compact and easily fabricated device for deriving several revolutions, such as needed for starting an internal combustion engine, from a relatively short single stroke of a fluid operated piston, the device shown being of the same general character as that of the Chilton Patent No. 1,921,344, but differing therefrom in certain important respects which will appear upon inspection of the accompanying drawings and the following particular description of one form of mechanism embodying the invention. It is to be understood, however, that the drawings are for the purpose of illustration only, and are not designed as a definition of the limits of the invention, reference being had to the appended claims for this purpose.

In the drawings:—

Fig. 1 is a longitudinal sectional view of the piston and engine starting gear unit of the present invention.

Fig. 2 is a view in elevation from a viewpoint at right angles to that of Fig. 1;

Fig. 3 is a view in elevation, from a point at right angles to the viewpoints of both Figs. 1 and 2.

Figure 4:
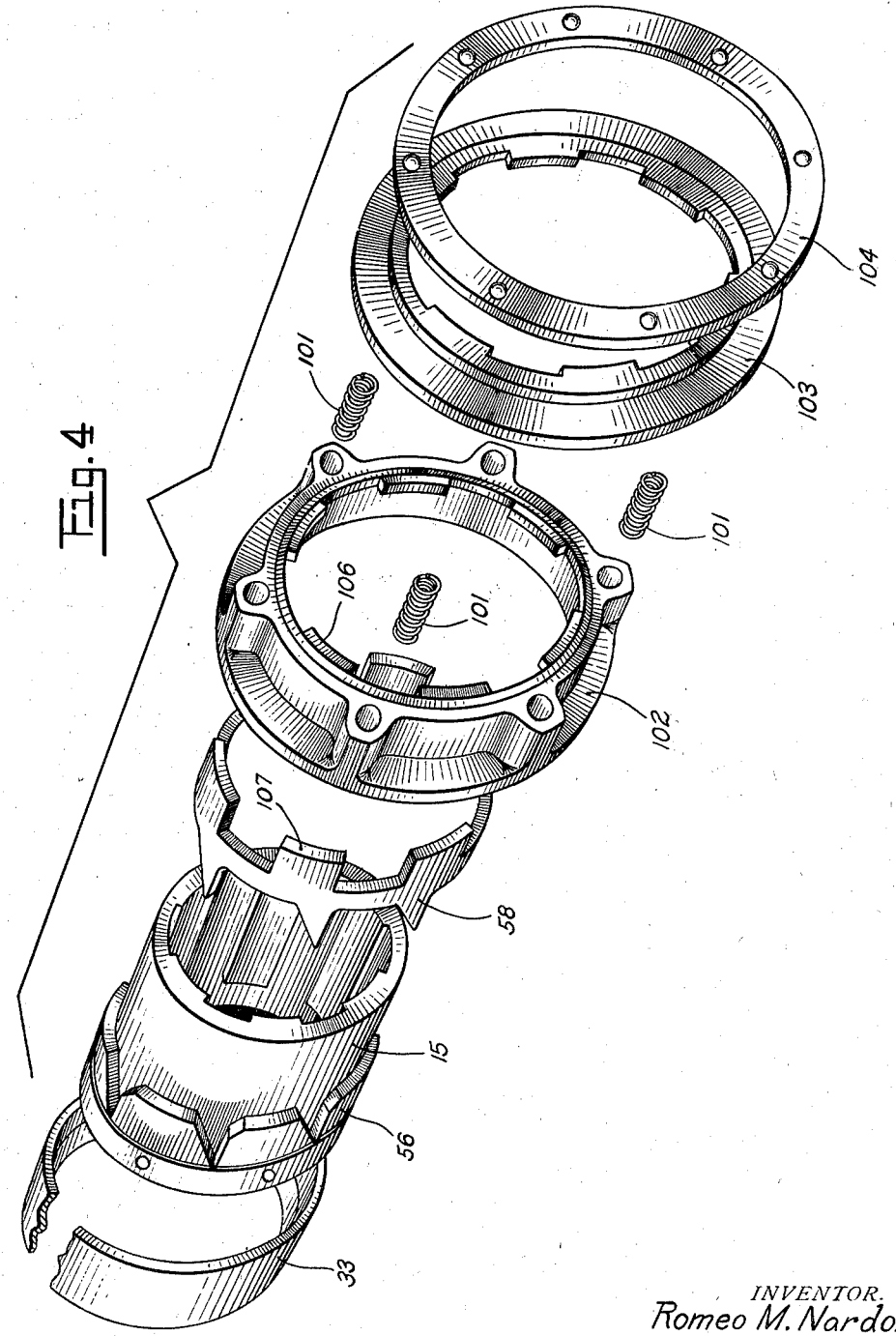
Fig. 4 is an exploded view in perspective of the meshing mechanism and associated parts.

With reference to the drawings, and more particularly to Fig. 1, the piston and engine starting gear units comprises a body member 10 having a flange 12 by which it is secured to the engine crankcase 13 as by bolts 14, the flange being conveniently of a size standardized for aircraft engine starters. The engine crankshaft, or other drive shaft (not shown) is provided with an engine jaws 11 engageable by the starter jaw 15 as will be later more fully described.

Secured in a quickly detachable manner to an annular flange 16 integral with the body 10 is a cylinder 17 having a closed head 18 and a base plate 19 constituting an integral part of a threaded sleeve or boss 20. Slidably and rotatably fitted within the cylinder 17 is a piston 21 movable with the shaft or sleeve 22 which is externally threaded as at 23, to cooperate with the internally threaded sleeve 20. In the cooperating helical grooves 23 and 24 are placed a series of anti-friction members shown as balls 25, suitable stops 26 being provided at each end of each helical groove to retain the balls in the assembly. A third sleeve 27 is drivably connected with the sleeve 22 by splines 28 and 29 which permit the axial travel of the piston 21 relative to the sleeve 27, but restrain these two parts to unitary rotation. An anti-friction thrust bearing 30 is preferably interposed between the flanged skirt 31 of the sleeve 27 and an inwardly extending circular rim 32 of the body 10.

The starter jaw 15 is splined for limited axial travel upon the skirt 31, whereby it moves into engine engaging position, from the disengaged position shown. A pliable (preferably leather) sealing member 35 engages a ring 33 which is held to a ratchet ring 56 which is in turn secured to jaw 15 by pins 34. Sealing member 35 is secured to a baffle plate 36 by rivets, as indicated at 37, and the plate 36 has a flanged portion 38 secured to the flange 12 by screws 39.

During its travel the hollow shaft or sleeve 22 slides over the sleeve 27 by means of the splines 29 and 28 which transmit (with the aid of antifriction balls 41), the starting torque generated from the piston thrust by the helical groove connection, and the friction produced may impose considerable axial pressure on the sleeve 27. The anti-friction ball bearings 25 and 41 take such friction reactions which might otherwise impose too much restraint to the return action of the spring 42. This spring 42 has one end resting against the closure plate 19 of the cylinder 17, and its opposite end abuts the thrust ring 43, which is, in effect, the outer race of a ball-bearing assembly 45 axially movable with but rotatably free of the piston 21, the intervening bearing balls 45 facilitating free rotation of the outer race 43 of the bearing, the outer race being possibly constrained to rotation by a possible twisting action of the spring 42 as the latter is compressed in the forward travel of the piston, there being piston rings 46 to insure against the loss of pressure as the piston moves forward, and also to yieldably oppose rotation of the piston, even though shaft 22 and outer race 43 should both rotate to some extent. It will be noted that the terminal points of the inner race 44 lie wholly inside a cylinder containing the centers of all the balls 45, while the terminal points of outer race 43 lie wholly outside the said cylinder. By reason of this disposition of the "terminal points" (forming the lines or areas of rolling contact) the assembly serves to resist radial and thrust loads with equal effectiveness.

Due to the bolted split clamp connection 47 between the cylinder 17 and the body flange 16, the former may be quickly detached for removing any fouling that many occur where combustible cartridges are used as the source of fluid pressure to move the piston 21. Similarly, exhaust ring 62 may be removed by sliding it over the head end 18 of externally tapered cylinder 17, after retraction of screw detent 94, and following removal of control housing 64.

One of the objects of this invention is to obtain a relatively large number of turns from a relatively short piston travel wherefor a relatively short lead or helix angle is used for the main driving threads 23 and 24 and the rolling antifriction members 25 and 41 are introduced to insure high mechanical efficiency in spite of this small angle of helix.

Cooperating with the above described ratchet ring 56, as shown best in Fig. 4, is a second ratchet ring 58 frictionally held—but only during the meshing movement of jaw 15—against rotation by the pressure of springs 101 upon plate 102, the reaction, or abutment, of the springs being upon plate 103 bearing upon roller cage 104 which in turn abuts circular rim 32 of housing 10. Plate 102 has splines 106 engaging splines 107 of ratchet ring 58 thus holding the latter against rotation by reason of the friction of plate 102 against the surface of the stationary sealing assembly 35.

The operation of the mechanism so far described is as follows:

Upon pressure being generated and released from the pressure chamber (not shown) by a pressure element, such as an explosive cartridge, the high pressure fluid is conveyed by means of the pipe connection 48 to the entrance chamber 49 by way of the slotted wall 50, and acts both upon the piston 21 and the auxiliary exhaust valve 52, thus holding the latter upon its seat 53 against the tendency of the spring 54 to unseat it. There being no resistance other than the spring 42 to the movement of the piston 21, it is advanced to the left and enforces a rotary motion on the sleeve 27 and starter jaw 15 due to the helical grooves 23 and 24 and the splines 29 and 28. During this first rotation of the jaw 15 its ratchet ring 56 rides obliquely upon the sloping surfaces of the cooperating frictionally held ratchet ring 58, thereby causing the jaw 15 to move forward as it rotates, but the length of the cooperating sloping surfaces of rings 56 and 58 is such that they cannot become fully disengaged at any stage of this combined rotary and longitudinal movement. This movement continues until the jaw teeth of member 15 are fully meshed with the corresponding teeth of the driven member 11. When this condition of complete meshing occurs the ensuing continued rotation of the jaw 15 will produce a corresponding rotation of both the ring 56 and the ring 58. As this rotation proceeds the driven member 11 is correspondingly rotated and the engine crankshaft is accordingly "turned over". Eventually, the piston will reach a point where the exhaust ports 60 are uncovered, and the fluid pressure will escape through conduit 61; the spring 42 can then return the piston to the normal position shown in the drawings. At whatever point of the travel the engine starts under its own power, it is free to overrun the jaw 15 due to the sloped or angular formation of the teeth, but until this overrunning occurs the jaws 15, 11 will remain meshed.

As the pressure fluid escapes into exhaust ring 62, and passes along conduit 61 in response to the uncovering of the ports 60, it reaches the ported cage 63 of the control housing 64 (on its way to the exhaust pipe 91) and from this region it is effective by reason of the connecting passage 65 (which has a width approximately equal to its length), to exert pressure upon the inner side of the valve 52, thereby creating a pressure which, coupled with that of the spring 54, is sufficient to lift the valve 52 from its seat 53. When this occurs the remaining pressure fluid in the cylinder 17 may escape to the atmosphere by way of the now opened valve 52 (the extent of movement of which is limited by the annular stop 67) and this escape will continue until the return movement of the piston 21—proceeding under the influence of spring 42 which now over-powers the rapidly falling pressure of the escaping fluid—reseats the valve 52 by direct contact with the projecting valve stem 68 in the path of the advancing piston, the length of the valve stem 68 being so chosen as to insure a complete seating of the valve just as the piston reaches the position indicated in the drawing on its return stroke. The fluid under pressure having by this means escaped, the device is now ready for a second operation by re-admission of pressure fluid through the inlet 48 if and when desired.

A frangible disc 92 divides the exhaust cage 63 from the inlet chambers 48, 49, and is subject to rupture to permit escape of fluid in the extraordinary event of excessive pressure, such rupturing permitting the excessive pressure to escape through exhaust pipe 91.

What is claimed is:—

1. In an engine starter, the combination of a piston adapted for axial advance, a cylinder guiding the axial advance of said piston, said cylinder having a head through which fluid under pressure is admitted to cause axial advance of the piston, said cylinder also having a closure plate at its opposite end, an internally threaded boss integral with said closure plate, a shaft threadedly engaging said boss and rotatable relatively to said piston and also axially movable with said piston, an engine engaging member rotatable with said shaft to impart initial rotation to the engine, means responsive to rotary movement of said shaft and engine engaging member, in unison, to move the latter into engine engaging position, said means including a ratchet ring yieldably held against rotary movement, and means including a cooperating ratchet ring mounted on said engine engaging member and having teeth slidable along the teeth of said first-named ratchet ring to convert rotary movement of said engine engaging member into axial movement of sufficient extent to produce engine engagement.

2. In an engine starter, the combination of a piston adapted for axial advance, a cylinder guiding the axial advance of said piston, said cylinder having a head through which fluid under pressure is admitted to cause axial advance of the piston, said cylinder also having a closure plate at its opposite end, an internally threaded boss integral with said closure plate, a shaft threadedly engaging said boss and rotatable relatively to said piston and also axially movable with said piston, an engine engaging member rotatable with said shaft to impart initial rotation to the engine, means responsive to rotary movement of said shaft and engine engaging member, in unison, to move the latter into engine engaging position, a spring surrounding said shaft to return the piston after its axial advance, and a ball bearing assembly mounted on the shaft, but separably free of the piston, to transmit the thrust of the spring to the said piston to cause its return movement.

3. In an engine starter, the combination of a solid surfaced piston adapted for axial advance, a cylinder guiding the axial advance of said piston, said cylinder having a head through which fluid under pressure is admitted to cause axial advance of the piston, said cylinder also having a closure plate at its opposite end, an internally threaded boss integral with said closure plate, a shaft threadedly engaging said boss and rotatable relatively to said piston and also axially movable with said piston, an engine engaging member rotatable with said shaft, means responsive to rotary movement of said shaft and engine engaging member, in unison, to move the latter into engine engaging position, an exhaust passage operative to exhaust the pressure fluid only while the piston is in advance of a predetermined position, and an auxiliary exhaust valve for discharge of pressure fluid during the remainder of the return stroke of the piston, said valve being closable by contact with a centrally disposed section of the solid surface of the piston as it completes its return movement.

4. In an engine starter, the combination of a solid surfaced piston adapted for axial advance, a cylinder guiding the axial advance of said piston, said cylinder having a head through which fluid under pressure is admitted to cause axial advance of the piston, said cylinder also having a closure plate at its opposite end, an internally threaded boss integral with said closure plate, a shaft threadedly engaging said boss and rotatable relatively to said piston and also axially movable with said piston, an engine engaging member rotatable with said shaft, means responsive to rotary movement of said shaft and engine engaging member, in unison, to move the latter into engine engaging position, an exhaust passage operative to exhaust the pressure fluid only while the piston is in advance of a predetermined position, and an auxiliary exhaust valve for discharge of pressure fluid during the remainder of the return stroke of the piston, said valve being closable by contact with a centrally disposed section of the solid surface of the piston as it completes its return movement said exhaust passage including a ported cage having a disc dividing the exhaust passage from the inlet, and said disc being breakable to permit excess inlet pressure to pass into said exhaust passage.

ROMEO M. NARDONE.